(12) United States Patent
Retana (10) Patent No.: US 9,742,670 B2
(45) Date of Patent: Aug. 22, 2017

(54) NON-ELIGIBLE DISTANCE VECTOR PROTOCOL PATHS AS BACKUP PATHS

(71) Applicant: Alvaro E. Retana, Raleigh, NC (US)

(72) Inventor: Alvaro E. Retana, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/223,871

(22) Filed: Mar. 24, 2014

(65) Prior Publication Data

US 2015/0271069 A1   Sep. 24, 2015

(51) Int. Cl.
*H04L 12/741* (2013.01)
*H04L 29/14* (2006.01)
*H04L 29/06* (2006.01)

(52) U.S. Cl.
CPC .............. *H04L 45/74* (2013.01); *H04L 69/14* (2013.01); *H04L 69/40* (2013.01)

(58) Field of Classification Search
None
See application file for complete search history.

(56) References Cited

U.S. PATENT DOCUMENTS

| | | | | |
|---|---|---|---|---|
| 5,964,841 A * | 10/1999 | Rekhter | ................... | H04L 45/02 370/255 |
| 7,298,693 B1 * | 11/2007 | Owens | ...................... | H04J 3/14 370/216 |
| 7,936,667 B2 | 5/2011 | Savage et al. | | |
| 2004/0100969 A1 * | 5/2004 | Sankar | ..................... | H04L 45/00 370/395.31 |
| 2005/0195835 A1 * | 9/2005 | Savage | ................... | H04L 43/00 370/401 |
| 2008/0310433 A1 * | 12/2008 | Retana | .................... | H04L 45/02 370/401 |
| 2009/0103533 A1 * | 4/2009 | Li | ........................ | H04L 41/0226 370/389 |
| 2010/0172237 A1 * | 7/2010 | Savage | ................. | H04L 45/123 370/228 |

(Continued)

OTHER PUBLICATIONS

Cisco. Cisco IOS IP Configuration Guide. Chapter: Configuration EIGRP. Feb. 2014.*

(Continued)

*Primary Examiner* — Jeffrey M Rutkowski
*Assistant Examiner* — Andre Tacdiran
(74) *Attorney, Agent, or Firm* — The Law Office of Kirk D. Williams (57) ABSTRACT

In one embodiment, non-eligible distance vector protocol paths are used as backup paths. In one embodiment, the distance vector protocol is Enhanced Interior Gateway Protocol (EIGRP) and unless a path is a feasible successor for a destination, the path is not eligible as a backup path. Therefore, if there is no feasible successor, there is no eligible backup path. One embodiment avoids an initial delay in finding a replacement path for traffic by determining and installing a non-eligible backup path (e.g., a path that is not a feasible successor) in one or more forwarding tables. In this manner, the router can immediately forward packets over this non-eligible backup path until, for example, forwarding in the network can converge in light of the primary path being no longer available.

9 Claims, 5 Drawing Sheets

(56) References Cited

U.S. PATENT DOCUMENTS

| | | | | |
|---|---|---|---|---|
| 2013/0242996 A1* | 9/2013 | Varvello | ............... | H04L 67/327 370/392 |
| 2014/0269266 A1* | 9/2014 | Filsfils | ................... | H04L 43/50 370/228 |
| 2015/0023173 A1* | 1/2015 | Sharma | ................... | H04L 45/22 370/236 |

OTHER PUBLICATIONS

"Introduction to EIGRP," Document ID: 13669, Aug. 10, 2005, Cisco Systems, Inc., San Jose, CA, USA (seven pages).

"Enhanced Interior Gateway Routing Protocol," Document ID: 16406, Sep. 9, 2005, Cisco Systems, Inc., San Jose, CA, USA (forty-four pages).

Savage et al., "Enhanced Interior Gateway Routing Protocol," Oct. 7, 2013, draft-savage-eigrp-01.txt, The Internet Society, Reston, VA (seventy-two pages).

\* cited by examiner

NON-ELIGIBLE DISTANCE VECTOR PROTOCOL PATHS AS BACKUP PATHS

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Enhanced Interior Gateway Routing Protocol (EIGRP), a distance vector protocol, is an interior gateway protocol suited for many different topologies and media. In a well-designed network, EIGRP scales well and provides extremely quick convergence times with minimal network traffic.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with determining and using non-eligible distance vector protocol paths as backup paths. In one embodiment, the distance vector protocol is Enhanced Interior Gateway Protocol (EIGRP) and unless a path is a feasible successor for a destination, the path is not eligible as a backup path. Therefore, if there is no feasible successor, there is no eligible backup path.

One embodiment includes a method, comprising: sending, from a packet switching device in a network, a proactive distance vector protocol request message requesting an identification of an alternative route for a destination, with the packet switching device currently having a successor that is valid for reaching the destination through the network; receiving a proactive distance vector protocol reply message from a backup neighbor packet switching device, responsive to the proactive distance vector protocol request message, identifying the backup neighbor packet switching device through which is a backup loop free path to the destination, with the backup neighbor packet switching device being different than a neighbor packet switching device associated with the successor; and responsive to said receiving a proactive distance vector protocol reply message, programming backup state in the packet switching device for using the backup neighbor packet switching device to reach the destination in response to the successor no longer being valid for reaching the destination through the network.

One embodiment includes a method, comprising: receiving, by a packet switching device in a network from a proactive querying packet switching device in the network, a proactive distance vector protocol request message requesting an identification of an alternative route for a destination; and reacting, by the packet switching device, to the proactive distance vector protocol request message, which includes determining and sending a proactive distance vector protocol reply message to the proactive querying packet switching device identifying the packet switching device having a loop free path to the destination while remaining in the non-active state for the destination.

2. Description

Disclosed are, inter alia, methods, apparatus, computer-storage media, mechanisms, and means associated with determining and using non-eligible distance vector protocol paths as backup paths. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes: sending, from a packet switching device in a network, a proactive distance vector protocol request message requesting an identification of an alternative route for a destination, with the packet switching device currently having a successor that is valid for reaching the destination through the network; receiving a proactive distance vector protocol reply message from a backup neighbor packet switching device, responsive to the proactive distance vector protocol request message, identifying the backup neighbor packet switching device through which is a backup loop free path to the destination, with the backup neighbor packet switching device being different than a neighbor packet switching device associated with the successor; and responsive to said receiving a proactive distance vector protocol reply message, programming backup state in the packet switching device for using the backup neighbor packet switching device to reach the destination in response to the successor no longer being valid for reaching the destination through the network.

In one embodiment, the proactive distance vector protocol request message is an Enhanced Interior Gateway Routing Protocol (EIGRP) with one or more values identifying the proactive nature of the proactive distance vector protocol request message for the destination such that a receiving packet switching device will not enter the active state for the destination. One embodiment includes performing the operations of sending, receiving and programming for a plurality of different destinations. In one embodiment, wherein the proactive distance vector protocol request message is an Enhanced Interior Gateway Routing Protocol (EIGRP) with one or more values identifying the proactive nature of the proactive distance vector protocol request message for the destination such that a receiving packet switching device will not enter the active state for the destination. One embodiment includes selecting, by the packet switching device, each particular destination of the plurality of different destinations from a plurality of destinations having a valid successor based on said particular destination not currently having a feasible successor. In one embodiment, the proactive distance vector protocol request message is an Enhanced Interior Gateway Routing Protocol (EIGRP) with one or more values identifying the proactive nature of the proactive distance vector protocol request message for the destination such that a receiving packet switching device will not enter the active state for the destination.

One embodiment includes: sending a plurality of packets to the destination from the packet switching device to the neighbor packet switching device associated with the successor while the successor is still valid; and in response to the successor being no longer valid for reaching the destination through the network, sending a plurality of packets to the destination from the packet switching device to the backup neighbor packet switching device. In one embodiment, the proactive distance vector protocol request message is an Enhanced Interior Gateway Routing Protocol (EIGRP) with one or more values identifying the proactive nature of the proactive distance vector protocol request message for the destination such that a receiving packet switching device will not enter the active state for the destination.

One embodiment includes running Enhanced Interior Gateway Routing Protocol (EIGRP) by the packet switching device to determine forwarding information for the network. In one embodiment, the distance vector protocol is Enhanced Interior Gateway Protocol (EIGRP).

One embodiment includes: receiving, by a packet switching device in a network from a proactive querying packet switching device in the network, a proactive distance vector protocol request message requesting an identification of an alternative route for a destination; and reacting, by the packet switching device, to the proactive distance vector protocol request message, which includes determining and sending a proactive distance vector protocol reply message to the proactive querying packet switching device identifying the packet switching device having a loop free path to the destination while remaining in the non-active state for the destination.

In one embodiment, said determining the proactive distance vector protocol reply message includes identifying a successor or feasible successor for the destination that is not the proactive querying packet switching device. One embodiment includes updating forwarding state in the packet switching device such that packets for the destination received from the proactive querying packet switching device will be forwarded out said identified successor or feasible successor for the destination that is not the proactive querying packet switching device. One embodiment includes running Enhanced Interior Gateway Routing Protocol (EIGRP) by the packet switching device to determine forwarding information for the network. In one embodiment, the proactive distance vector protocol request message is an Enhanced Interior Gateway Routing Protocol (EIGRP) with one or more values identifying the proactive nature of the proactive distance vector protocol request message for the destination such that a receiving packet switching device will not enter the active state for the destination.

In one embodiment, said determining the proactive distance vector protocol reply message includes: sending a second proactive distance vector protocol request message requesting an identification of an alternative route for a destination, and receiving a second receiving a proactive distance vector protocol reply message from a backup neighbor packet switching device, responsive to the proactive distance vector protocol request message, identifying the backup neighbor packet switching device through which is a backup loop free path to the destination. One embodiment includes updating forwarding state in the packet switching device such that packets for the destination received from the proactive querying packet switching device will be forwarded out said identified successor or feasible successor for the destination that is not the proactive querying packet switching device. In one embodiment, the distance vector protocol is Enhanced Interior Gateway Protocol (EIGRP).

One embodiment includes: one or more processing elements; memory; a plurality of interfaces configured for sending and receiving packets; and one or more packet switching mechanisms configured to packet switch packets among said interfaces. The one or more processing elements are configured to perform operations, including: generate a proactive distance vector protocol request message, subsequently sent from the packet switching device, requesting an identification of an alternative route for a destination, with the packet switching device currently having a successor that is valid for reaching the destination through the network; and programming backup state in the packet switching device for using a backup neighbor packet switching device to reach the destination in response to the successor no longer being valid for reaching the destination through the network in response to a received proactive distance vector protocol reply message from the backup neighbor packet switching device, responsive to the proactive distance vector protocol request message, identifying the backup neighbor packet switching device through which is a backup loop free path to the destination, with the backup neighbor packet switching device being different than a neighbor packet switching device associated with the successor. In one embodiment, the distance vector protocol is Enhanced Interior Gateway Protocol (EIGRP).

Figure 1:
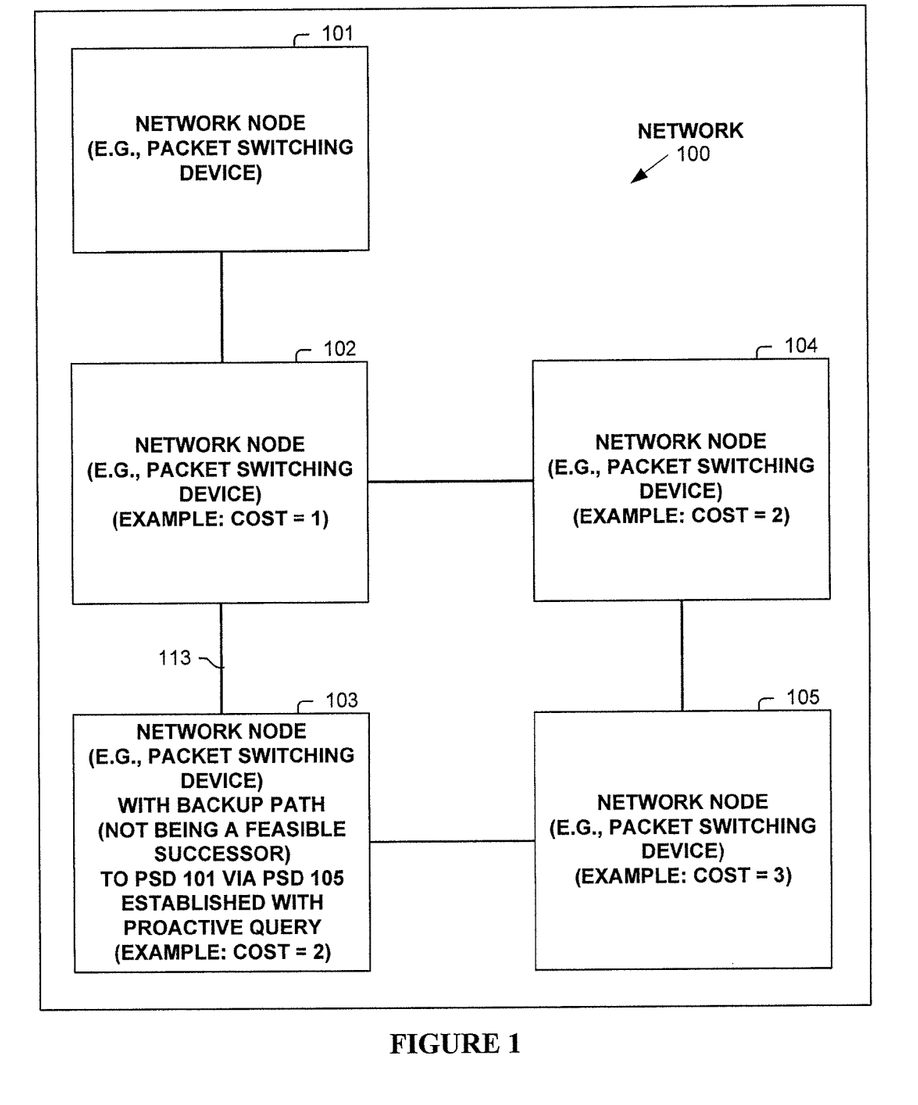
FIG. 1 illustrates a network operating according to one embodiment.

FIG. 1 illustrates a network 100 operating according to one embodiment. Shown are five packet network nodes 101-105 in network 100. Packet network nodes 102-105 are annotated with an example cost for reaching packet network node 101. This cost is simplified for illustrative purposes, as typically a different cost than strict hop count is used by a distance vector protocol such as EIGRP.

When network 100 is fully operational, packet network node 103 sends packets with a destination of packet network node 101 through packet network node 102. In the terminology of EIGRP, the successor is packet network node 102, as a successor is a neighboring router used for packet forwarding that has a least cost path to a destination that is guaranteed not to be part of a routing loop. A feasible successor is a path whose reported distance is less than the feasible distance (current best path).

However in network 100 as shown, there is no feasible successor (e.g., as the cost (3) advertised by packet network node 105 is greater than the cost (2) of packet network node 103). In other words, there is no eligible distance vector protocol path as a backup path. In EIGRP, if link 113 between packet network nodes 102 and 103 goes down, then packet network node 103 performs route computation, which puts the route for destination 101 in the active state and takes time for the forwarding in the network to converge.

One embodiment reduces or avoids this initial delay by determining and installing a non-eligible backup path (e.g., a path that is not a feasible successor) in one or more forwarding tables. In this manner, the router can, in certain embodiments, immediately forward packets over this non-eligible backup path until, for example, forwarding in the network can converge in light of the primary path being no longer available. Embodiments are described herein especially in relation to EIGRP and its terminology, with the understanding that the teachings herein are not so limited and apply to networks employing other distance vector protocol(s).

One embodiment determines this non-eligible backup path by a network node initiating a proactive query of its neighbor(s) to find a backup path that is not eligible under the rules of a distance vector protocol used by the network node. In one embodiment, this proactive query includes one or more values (e.g., bit flag) to indicate that the query does not represent an active state for the destination, but rather is a proactive query seeking a non-eligible backup path. The proactive query identifies that the destination for which the query is issued is still reachable, and that the query is to find a non-eligible backup path. In one embodiment, if a neighbor node has a successor or feasible successor not through the requesting network node, the neighbor provides a response to the network node of a possible backup path. In one embodiment, if a neighbor node has itself determined a non-eligible backup path not through the requesting network node, the neighbor provides a response to the network node of a possible backup path.

The originating network node selects a non-eligible backup path from the responses, and uses as the backup path. In one embodiment, the neighbor of the selected non-eligible backup path installs state for forwarding packets received from the network node over this non-eligible backup path.

In one embodiment, when the non-eligible backup path is used to forward traffic, the active mode is initiated for the destination in order to allow the network to converge upon the new network topology. The non-eligible backup path allows packets to be forwarded to the destination until such convergence occurs. Additionally, the existence of the proactive state in a network node is an indication that it is part of a backup path. If the conditions of that non-eligible backup path change, then the forwarding information associated with the non-eligible backup path is updated accordingly. In one embodiment, if the destination is no longer reachable through the non-eligible backup path (e.g., due to a change in the topology or other reachability event), then the non-eligible backup path is disabled. In one embodiment, if a proactive distance vector protocol request message is received through the same interface on which the proactive distance vector protocol reply message of the non-eligible backup path was received, the non-eligible backup path is updated (e.g., as the destination is not reachable anymore over the non-eligible backup path). In one embodiment, if the metric to the destination changes through the non-eligible backup path (e.g., due to a change in the topology or other reachability event), then an updated proactive distance vector protocol reply message is issued.

In network 100 of FIG. 1, network node 103 has a successor (network node 102) to network node 101 for a destination, but no feasible successor. In one embodiment, network node 103 sends out a proactive distance vector protocol request message to network node 105 (e.g., all neighbors that is not the successor) requesting an identification of an alternative route for reaching network node 101. In response, network node 105 sends a proactive distance vector protocol reply message identifying network node 105 through which is a backup loop free path to network node

101. Network node 103 programs backup state for using network node 105 to reach the network node 101 in response to the successor (network node 102) no longer being valid for reaching network node 101 through network 100. In one embodiment, network node 105 installs forwarding state such that packets received from network node 103 for network node 101 will be forwarded appropriately.

Figure 2A:
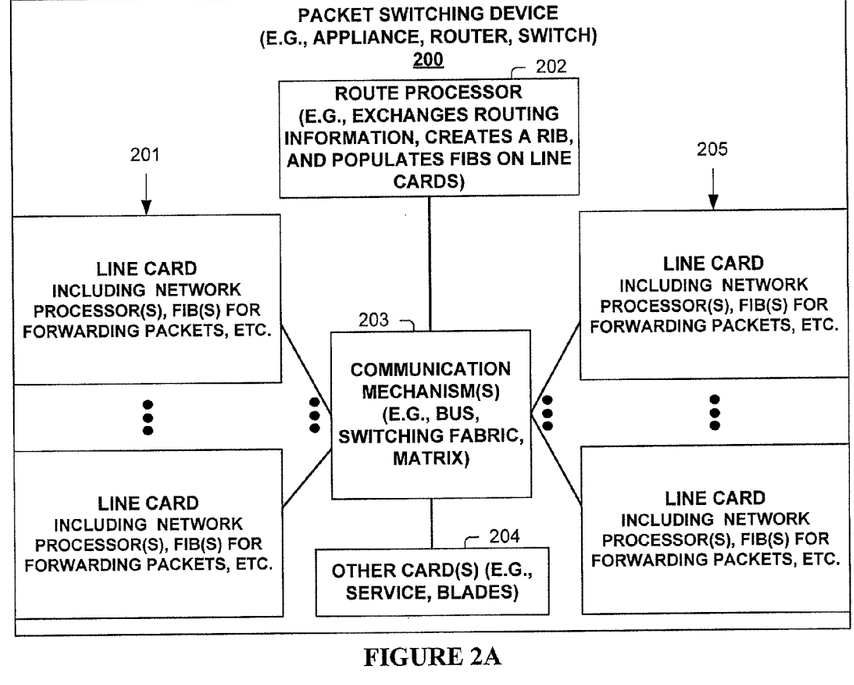
FIG. 2A illustrates a packet switching device according to one embodiment.

One embodiment of a packet switching device 200 (e.g., network node) is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with determining and using non-eligible distance vector protocol paths as backup paths. Packet switching device 200 also has a control plane with one or more processing elements 202 for managing the control plane and/or control plane processing of packets associated with determining and using non-eligible distance vector protocol paths as backup paths. Packet switching device 200 also includes other cards 204 (e.g., service cards, blades) which include processing elements that are used in one embodiment to process packets associated with determining and using non-eligible distance vector protocol paths as backup paths, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform operations associated with determining and using non-eligible distance vector protocol paths as backup paths.

Figure 2B:
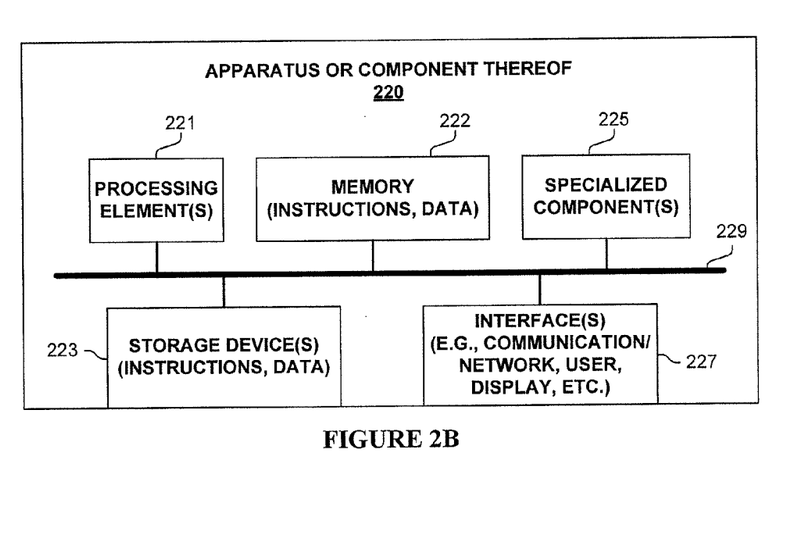
FIG. 2B illustrates an apparatus according to one embodiment.

FIG. 2B is a block diagram of an apparatus 220 used in one embodiment associated with determining and using non-eligible distance vector protocol paths as backup paths. In one embodiment, apparatus 220 performs one or more processes (which may include synchronization processing), or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
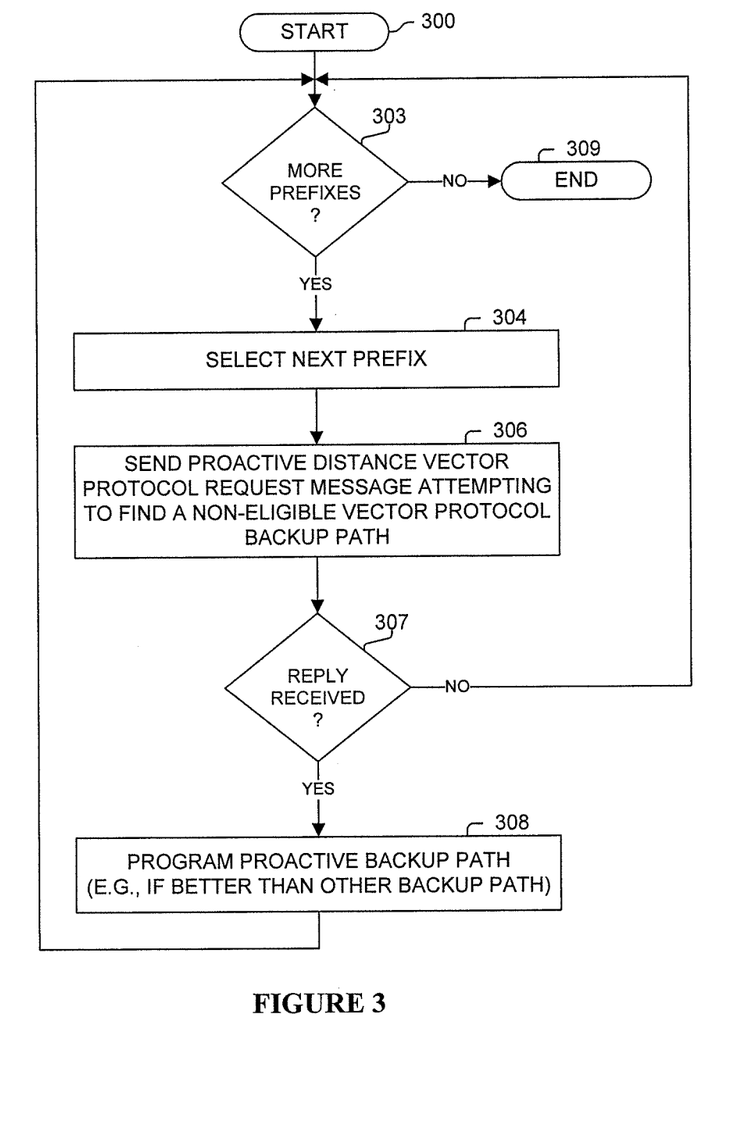
FIG. 3 illustrates a process according to one embodiment.

FIG. 3 illustrates a process performed in one embodiment. Processing begins with process block 300. As determined in process block 303, while there are more prefixes for which to determine a non-eligible distance vector protocol path to use as a backup path for the prefix, then processing proceeds through process block 304-308; else processing of the flow diagram of FIG. 3 is complete as indicated by process block 309. One embodiment sequences through all prefixes that do not have a backup path (e.g., feasible successor when using EIGRP) in determining a non-eligible distance vector protocol path to use as a backup path for the prefix. One embodiment only performs this processing for a subset of these prefixes, such as, but not limited to, those associated with higher-priority traffic, those defined by a policy, etc.

In process block 304, a next prefix is selected for determining a non-eligible distance vector protocol path to use as a backup path for the prefix. In process block 306, a proactive distance vector protocol request message is sent typically to all neighbors not on the primary path (e.g., not to the successor) attempting to find a non-eligible vector protocol backup path. This request message is different from a standard query which would put a route in the active state. In one embodiment, the proactive distance vector protocol request message includes one or more values (e.g., bit flag, header or payload value) differentiating the proactive distance vector protocol request message from a standard query message. As determined in process block 307, if no reply messages are received, processing returns to process block 303. Otherwise, one or more proactive distance vector protocol reply messages are received from one or more backup neighbor packet switching devices as determined in process block 307, and one of these non-eligible distance vector protocol paths is selected to use as a backup path for the prefix and correspondingly programmed in the forwarding information of the network node in process block 308. Processing returns to process block 303.

Figure 4:
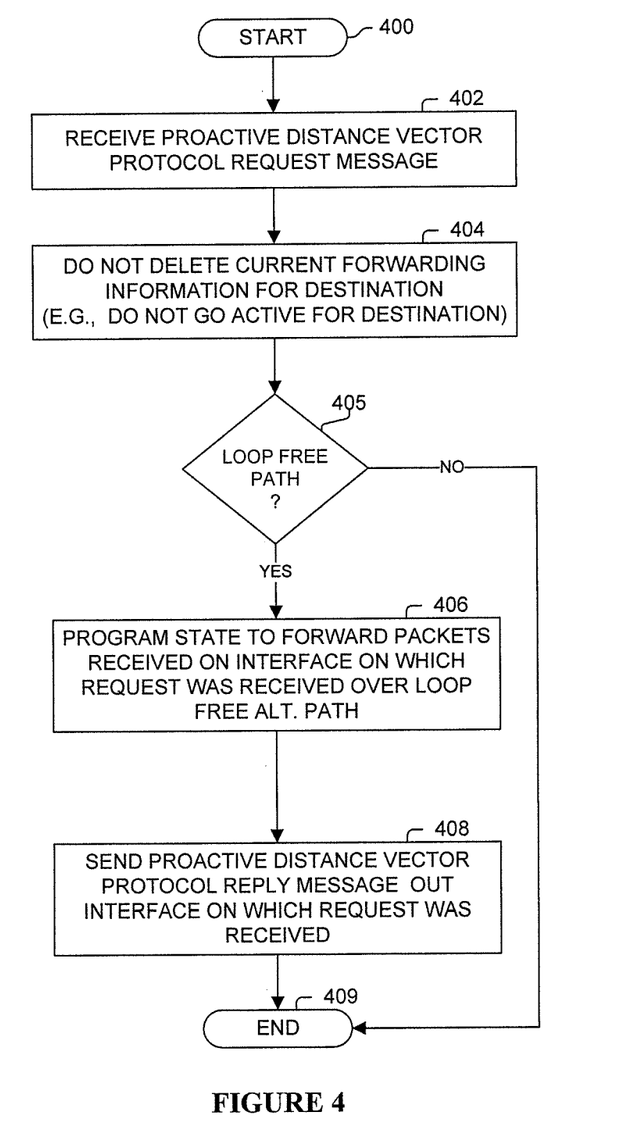
FIG. 4 illustrates a process according to one embodiment.

FIG. 4 illustrates a process performed in one embodiment. Processing begins with process block 400. In process block 402, a proactive distance vector protocol request message is received. In process block 404, the receiving network node recognizes the received message as a proactive request, and therefore does not delete any current forwarding information for the destination (e.g., does not go active for the destination).

As determined in process block 405, if the receiving network node has a loop free alternative path to the destination (e.g., not through the neighbor network node that sent the request), then processing proceeds through process block 406 and 408. In process block 406, the network node programs state to forward packets to be sent to the destination and received on the interface on which the proactive distance vector protocol request message was received over the loop free alternative path to the destination. In process block 408, the network node sends a proactive distance vector protocol reply message out the proactive distance vector protocol request message was received information its neighbor that it has a loop free alternative path that the neighbor can use as a non-eligible distance vector protocol backup path. Processing of the flow diagram of FIG. 4 is complete as indicated by process block 409.

Otherwise, the receiving node determined that it did not have a loop free alternative path to the destination. In one embodiment, processing proceeds directly to process block 409 and no reply message is sent. In one embodiment, the network node attempts to find an alternative backup path such as, but not limited to, based on the process described in FIG. 3, and then processing proceeds through process blocks 406, 408, and 409.

Figure 5:
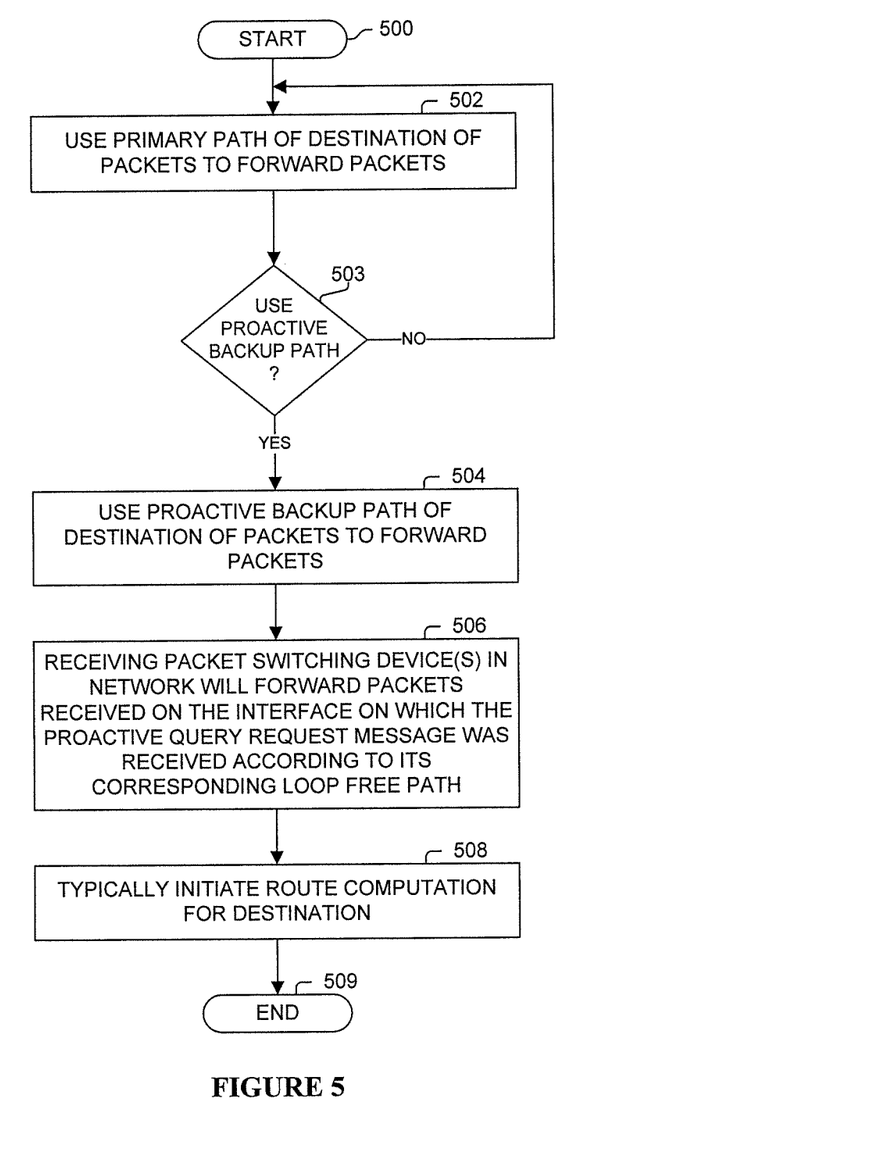
FIG. 5 illustrates a process according to one embodiment.

FIG. 5 illustrates a process performed in one embodiment. Processing begins with process block 500. In process block 502, the network node uses the primary path determined using a distance vector protocol to forward packets. As determined in process block 503, if the primary path should continue to be used and not the proactive backup path, then processing returns to process block 502.

Otherwise, as determined in process block 503, the proactive backup path for the destination should be used, and in process block 504 packets are forwarded to the destination using the proactive backup path. In process block 506, network node(s) in the network that receive these packets forwarded over the proactive backup path accordingly. In particular, the packets for the destination will be received on the interface on which the proactive distance vector protocol request message was received, and will be forwarded appropriately over a loop free path to the destination. In process block 508, typically the originating network node will initiate route computation for the destination (e.g., put it in the active state) so the network can converge. But until such convergence, the non-eligible distance vector protocol path is used to forward packets. Additionally in one embodiment, the active mode query causes the proactive forwarding state to be removed from a network node. Processing of the flow diagram of FIG. 5 is complete as indicated by process block 509.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   in a network using Enhanced Interior Gateway Routing Protocol (EIGRP) in determining forwarding information,
   a packet switching device sending an EIGRP proactive distance vector protocol request message requesting an identification of an alternative route for a destination that is an EIGRP non-eligible backup path, while the packet switching device currently having an EIGRP successor that is valid for reaching the destination through the network, with the EIGRP proactive distance vector protocol request message being an extension of EIGRP and including one or more values identifying the proactive nature of the EIGRP proactive distance vector protocol request message for the destination to identify to a receiving packet switching device: not to enter an EIGRP active state for the destination and to provide an EIGRP proactive distance vector protocol reply message specifying an EIGRP non-eligible backup path;
   in response to said sent proactive distance vector protocol request message, the packet switching device receiving the EIGRP proactive distance vector protocol reply message from a backup neighbor packet switching device identifying the backup neighbor packet switching device through which is a backup loop free path to the destination, with the backup neighbor packet switching device being different than a neighbor packet switching device associated with the EIGRP successor; and
   responsive to said receiving the EIGRP proactive distance vector protocol reply message, programming backup state in the packet switching device for using the backup neighbor packet switching device to reach the destination in response to the EIGRP successor no longer being valid for reaching the destination through the network.

2. The method of claim 1, comprising performing the operations of sending the EIGRP proactive distance vector protocol request message, receiving the EIGRP proactive distance vector protocol reply message, and programming backup state for each of a plurality of different destinations.

3. The method of claim 2, comprising the packet switching device selecting each particular destination to be in the plurality of different destinations from a plurality of destinations having a valid EIGRP successor based on said particular destination not currently having an EIGRP feasible successor.

4. The method of claim 1, comprising:
   sending a first plurality of packets to the destination from the packet switching device via the neighbor packet switching device associated with the EIGRP successor while the EIGRP successor is still valid; and
   in response to the EIGRP successor being no longer valid for reaching the destination through the network, sending a second plurality of packets to the destination from the packet switching device via the backup neighbor packet switching device.

5. A method, comprising:
   running Enhanced Interior Gateway Routing Protocol (EIGRP) by a packet switching device to determine forwarding information for a network;
   the packet switching device receiving an EIGRP proactive distance vector protocol request message requesting an identification of an alternative route for a destination that is an EIGRP non-eligible backup path from an EIGRP proactive querying packet switching device in the network, while the EIGRP proactive distance vector protocol request message being an extension of EIGRP and including one or more values identifying the proactive nature of the proactive distance vector protocol request message for the destination to identify to the packet switching device: not to enter an EIGRP active state for the destination and to provide an EIGRP proactive distance vector protocol reply message specifying an EIGRP non-eligible backup path; and
   the packet switching device reacting to the EIGRP proactive distance vector protocol request message, which includes determining and sending the EIGRP proactive distance vector protocol reply message to the EIGRP proactive querying packet switching device identifying the packet switching device having a loop free path to the destination while not entering the EIGRP active state for the destination.

6. The method of claim 5,
wherein said determining the EIGRP proactive distance vector protocol reply message includes identifying an EIGRP successor or an EIGRP feasible successor for the destination that is not the EIGRP proactive querying packet switching device.

7. The method of claim 6, comprising
updating forwarding state in the packet switching device such that packets for the destination received from the EIGRP proactive querying packet switching device will be forwarded out said identified EIGRP successor or EIGRP feasible successor for the destination that is not the EIGRP proactive querying packet switching device.

8. The method of claim 5, comprising
updating forwarding state in the packet switching device such that packets for the destination received from the EIGRP proactive querying packet switching device will be forwarded out said identified EIGRP successor or EIGRP feasible successor for the destination that is not the EIGRP proactive querying packet switching device.

9. A packet switching device, comprising:
one or more processors with memory; and
at least one network interface that send and receive packets;
wherein the packet switching device performs operations, including:
running Enhanced Interior Gateway Routing Protocol (EIGRP) to determine forwarding information for a network;
generating and sending an EIGRP proactive distance vector protocol request message requesting an identification of an alternative route for a destination that is an EIGRP non-eligible backup path, while the packet switching device currently having an EIGRP successor that is valid for reaching the destination through the network, with the EIGRP proactive distance vector protocol request message being an extension of EIGRP and including one or more values identifying the proactive nature of the proactive distance vector protocol request message for the destination to identify to a receiving packet switching device: not to enter an EIGRP active state for the destination and to provide an EIGRP proactive distance vector protocol reply message specifying an EIGRP non-eligible backup path; and
programming backup state in the packet switching device for using a backup neighbor packet switching device to reach the destination in response to the successor no longer being valid for reaching the destination through the network in response to the EIGRP proactive distance vector protocol reply message received from the backup neighbor packet switching device in response to the sent EIGRP proactive distance vector protocol request message, with the EIGRP proactive distance vector protocol reply message identifying the backup neighbor packet switching device through which is a backup loop free path to the destination, with the backup neighbor packet switching device being different than a neighbor packet switching device associated with the successor.

\* \* \* \* \*